United States Patent [19]

Click et al.

[11] 3,768,655
[45] Oct. 30, 1973

[54] TUBE GUIDE FOR FILTERING APPARATUS

[75] Inventors: Michael K. Click; Jerry L. Timmons, both of Lebanon, Ind.

[73] Assignee: The Carborundum Company, Niagara Falls, N.Y.

[22] Filed: Jan. 8, 1973

[21] Appl. No.: 321,608

Related U.S. Application Data

[63] Continuation of Ser. No. 102,741, Dec. 30, 1970, abandoned.

[52] U.S. Cl. .............................................. 210/236
[51] Int. Cl. ............................................ B01d 27/06
[58] Field of Search ................... 210/487, 236, 232, 210/323

[56] References Cited
UNITED STATES PATENTS

| | | | |
|---|---|---|---|
| 3,442,390 | 5/1969 | Petrucci et al. | 210/323 |
| 3,405,807 | 10/1968 | Burkhardt | 210/232 |
| 3,319,793 | 5/1967 | Millor, Jr. et al. | 210/323 X |

Primary Examiner—Samih N. Zaharna
Assistant Examiner—F. F. Calvetti
Attorney—David F. Dougherty et al.

[57] ABSTRACT

In a filtering apparatus, a tube guide is employed for positioning a filter cartridge on a seating member. The tube guide comprises an elongated member which projects upwardly to guide the filter cartridge into registry with the seating member. A lower fastening portion of the tube guide includes a stop which engages a top portion of the seating member to prevent downward movement of the tube guide. A snap-lock on the tube guide engages the bottom of the seating member to prevent upward movement of the tube guide.

1 Claim, 4 Drawing Figures

TUBE GUIDE FOR FILTERING APPARATUS

This is a continuation of copending application Ser. No. 102,741, filed Dec. 30, 1970, now abandoned.

BACKGROUND OF THE INVENTION

This invention relates to an improved apparatus for guiding tubes onto a seating member and more particularly to a tube guide for insuring the proper registry of a filter cartridge with a seating member.

In one type of filter apparatus which is designed to be used with an elongated annular filter cartridge, the filter tank is partitioned into an influent and effluent zone by an internal plate. A plurality of seating members mounted on the plate provide passages for the flow of fluid from the influent zone to the effluent zone. A plurality of filter cartridges are in bearing relationship with the seating member on the influent side of the plate.

Due to the design of the filter tank, the filter cartridges are installed by passing the tubes through an opening at one end of the tank. Since the seating members are located in the lower portion of the filter tank, the installer must hold the top end of the tube in hand and grope for a seating member with the other end. Once the seating member is located, the filter cartridge or tube is positioned therein and the upper end of the filter cartridge is then fastened into place. This installation procedure is often time consuming due to the difficulty of locating the seating member. Furthermore, the installer is never absolutely certain that the filter cartridge is properly seated. If the filter tube is not properly seated, the filtrate can become contaminated resulting in an unefficient and ineffective operation.

Heretofore, filter tubes have been installed in seating members with difficulty and at the risk of improper registry with the seating member.

SUMMARY OF THE INVENTION

It is an object of the present invention to provide an improved tube guide for a filtering apparatus which insures the proper positioning of a filter cartridge in a seating member.

It is another object of the present invention to provide a tube guide that is easily installed in seating members used in conventional filtering apparatus.

It is another object of the present invention to provide an inexpensive tube guide of simple construction.

It is a further object of the present invention to increase the ease with which filter cartridges are installed in a filtering apparatus and reduce the risk of an improper installation.

Other and further objects of the present invention will become apparent upon reading the following description.

In accordance with the present invention, there is provided a tube guide adapted for mounting within a seating member for positioning a filter cartridge during installation thereof, said tube guide comprising an elongated member having an upper portion for guiding a filter cartridge into registry with the seating member, a stop projecting outwardly from a lower portion of said elongated member for engaging the upper portion of the seating member to prevent downward movement of the tube guide, and a means for engaging the bottom portion of said seating member to prevent an upward movement of the tube guide.

DESCRIPTION OF THE PREFERRED EMBODIMENT

Figure 1:
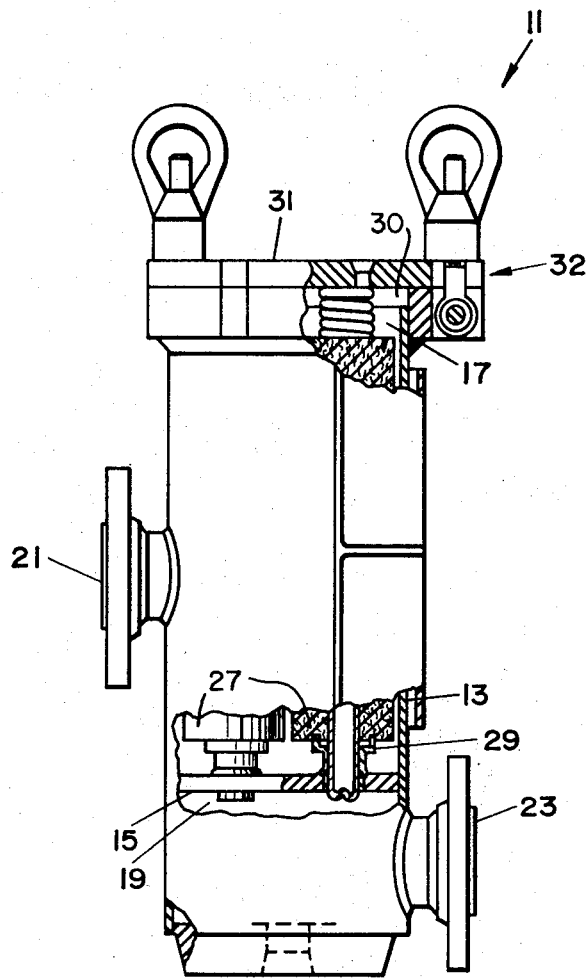
FIG. 1 is a side elevational view of a filtering apparatus.

Referring to FIG. 1, in detail, a filtration apparatus utilizing the tube guide of the present invention is indicated generally by reference numeral 11. The filtration apparatus 11 comprises a cylindrical tank 13 having a closed bottom and divided by a partition 15 into an influent zone 17 and an effluent zone 19. An inlet conduit 21 communicates with the influent zone 17 and an outlet conduit communicates with the effluent zone 19.

Mounted within the influent zone 17 are a plurality of filter cartridges 27 through which the influent fluid must pass before entering the effluent zone 19 and being discharged from the tank 13 through outlet conduit 23. The filter cartridges 27 are annular in shape and are preferably wound from nylon or other suitable natural or synthetic fibers, in a manner well-known in the prior art. Each of the filter cartridges 27 is supported within the influent zone 17 by a seating member 29.

The filter cartridges 27 are placed into and removed from the tank 13 through an opening 30 in the top of the tank 13 which has an outwardly projecting flange around the opening 30. A cover 31 which may be removed to provide access to the influent zone 17 is provided with a fastening means 32 of a conventional screw down type. The fastening means 32 includes a bolt pivotally mounted to the tank 13 at one end. The opposite end which is threaded fits into a slot in the cover 31 and a tightening handle screws down on the threaded portion to firmly close the cover 31.

Each seating member 29 has a lower tubular portion 33 which extends through partition 15 in the sealing relationship thereto. An upper portion of seating member 29 is cup-shaped and extends into the influent zone 17. The inner surface 34 of the cup portion 35 is in bearing relationship to one end of a filter cartridge 27.

The filter cartridges 27 are in registry with sealing member 29 by frictional engagement of the cup portion 35 with the lower end of cartridge 27. The top portion of the cartridge is fitted into a top retaining member of a conventional type which is designed to apply a downward force to the filter cartridge to maintain a sealing relationship between the cartridge and cup portion 35.

Figure 2:
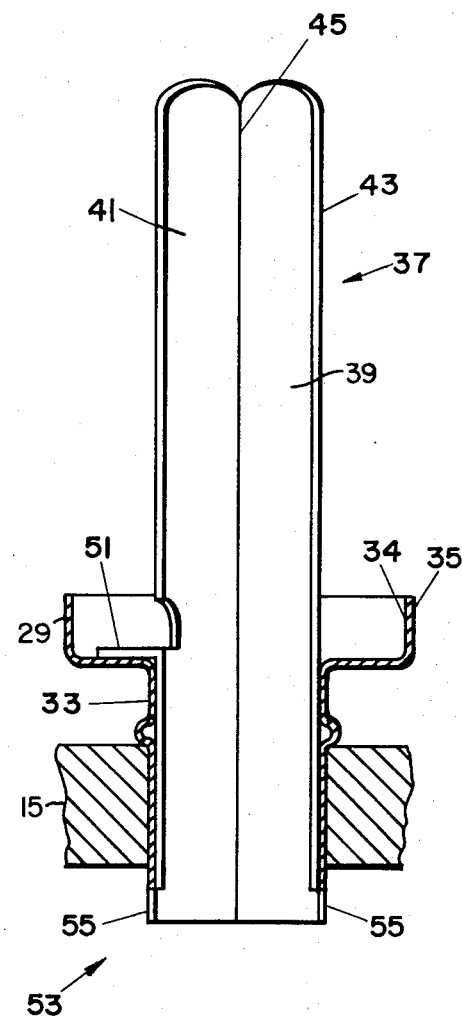
FIG. 2 is an end elevational view of the tube guide as installed in a seating member shown in section.
Figure 3:
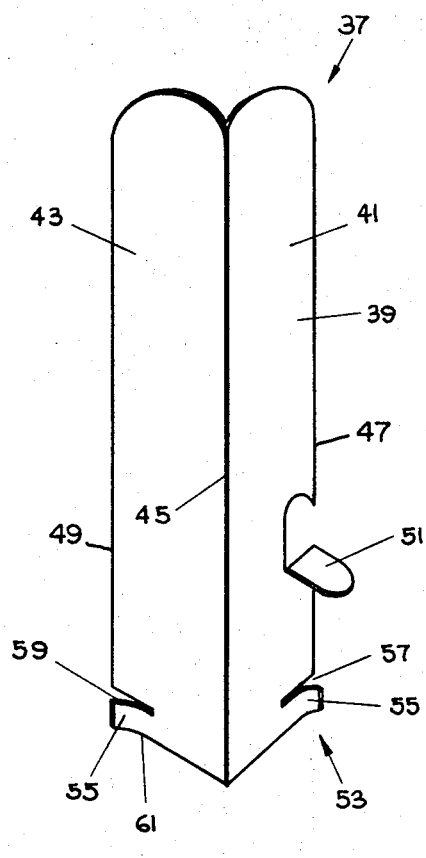
FIG. 3 is a perspective view of the tube guide.
Figure 4:
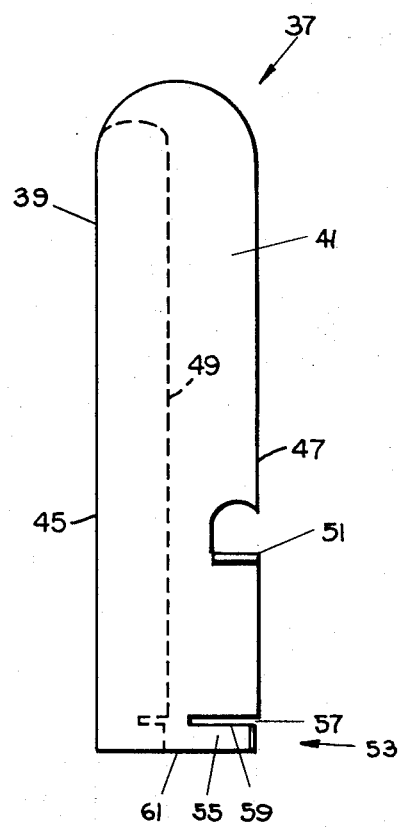
FIG. 4 is a side elevational view of the tube guide.

Referring to FIGS. 2–4 in detail, the tube guide 37 of the present invention comprises an elongated V-shaped member 39. Member 39 has a pair of vertically extending walls 41 and 43 which are slightly flared outwardly from their abutment 45 to their respective ends 47 and 49.

The upper portion of the V-shaped member 39 projects upwardly from the seating member 29 within the influent zone 17 a suitable distance to permit convenient positioning of the opening at one end of the filter cartridge 27 over the projecting portion of the V-shaped member 39. Each of the vertical walls 41 and 43 have curved top edges which prevent damaging the filter cartridge 27 during installation, which might otherwise occur if the edges were square or sharp. The abutment 45 and the ends of walls 47 and 49 which are substantially parallel are circumferentially spaced to confirm to the opening in the tubular portion 31 of seating member 29 so as to guide the cartridge 27 into bearing relationship with the cup portion 35.

The lower portion of the V-shaped member 39 is adapted to be securely fastened within the opening in the seating member 29. The abutment 45, walls 47 and 49 each contact the tubular portion 33 along the inside wall thereof due to their respective circumferential spacing as hereinbefore described. Thus, the tube guide 37 is restrained from lateral movement. A slight outward flaring of walls 41 and 43 from the abutment 45 aids in obtaining a tight fit within the tubular portion 33.

A stop member 51 extending outwardly from wall 41 engages the inner surface 34 of cup portion 35 to prevent movement of the tube guide 37 against a downward force. A stop member 51 is preferably a flat horizontal surface so as not to interfere with the bearing surfaces between filter cartridge 27 and cup portion 35. As illustrated in the drawings, stop member 51 is formed by cutting or punching a tab out of the wall 41 and bending the tab into a horizontal position.

A snap-lock 53 is provided at the bottom of walls 41 and 43 to securely fasten tube guide 37 in place and prevent movement thereof against an upward force. Since each snap-lock 53 is identical in construction, shape and location, it is believed that a description of one will suffice.

The snap-lock 53 comprises a protruding member 55 which projects outwardly from wall 41. The outward projection is such that when tube guide 37 is inserted into tubular portion 33 the protruding member 55 yields under a compressive force so as to permit the bottom portion of wall 41 to be inserted through seat member 29. When the protruding member 55 reaches the bottom edge of tubular portion 33, it snaps outwardly to form a griping engagement therewith.

As illustrated in the drawings, the protruding member 55 comprises a portion of the wall 41 which is formed between the bottom edge of wall 41 and a cut or notch 57 in the end 47 which is spaced from the bottom edge. The protruding member 55 is bent outwardly along a top edge 59 and inwardly along a bottom edge 61. It is spaced from stop member 51 so as to firmly engage the lower edge of tubular portion 33. Thus, the tube guide 37 is secured to the seating member 29 between the stop member 51 and the protruding member 55 by a permanent fastening.

The tube guide 37 of the present invention is easily fitted into place in seating members used in conventional dry cleaning equipment. Once the tube guide 37 has been installed, the changing of filter cartridges within the filtering apparatus is made a quicker and more efficient operation.

While a preferred embodiment of this invention has been described and illustrated, it is to be recognized that modifications and variations thereof may be made without departing from the spirit and scope of this invention as described in the appended claims.

What is claimed is:

1. An apparatus for guiding filtering cartridges onto a seating member of the type having a lower tubular portion with a bottom edge and an upper cup-shaped portion, said apparatus comprising an elongated member having a pair of V-shaped walls flaring outwardly from an abutment, each of said walls having a side edge and a bottom edge, the abutment and side edge of each wall being adapted to contact the inner surface of the lower tubular member when the elongated member is inserted therein, said elongated member having an upper portion for guiding a filter cartridge into registry with the cup portion of said seating member, a stop comprising a flat tab projecting outwardly from at least one of said walls for engaging the upper portion of said seating member to prevent downward movement of said elongated member, a protruding member on said elongated member adapted to engage the bottom edge of the tubular portion of the seating member to prevent upward movement of the elongated member, said protruding member including an upper and a lower edge, said lower edge being the bottom edge of a portion of said wall, said upper edge projecting outwardly from a respective wall and said lower edge projecting inwardly from a respective wall whereby said protruding member is forced inwardly as the elongated member is inserted into the tube portion and said protruding member snaps outwardly when the upper edge of the protruding member passes the bottom edge of the tubular portion.

* * * * *